(12) United States Patent
Okuzaki et al.

(10) Patent No.: US 7,117,672 B2
(45) Date of Patent: Oct. 10, 2006

(54) HYDRAULIC NON-STAGE TRANSMISSION

(75) Inventors: Hideo Okuzaki, Saitama (JP); Kenji Sakakibara, Saitama (JP); Yoshihisa Kanno, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 146 days.

(21) Appl. No.: 10/792,881

(22) Filed: Mar. 5, 2004

(65) Prior Publication Data

US 2004/0221575 A1 Nov. 11, 2004

(30) Foreign Application Priority Data

Mar. 14, 2003 (JP) ............................ 2003-069041

(51) Int. Cl.
*F16D 39/00* (2006.01)
(52) U.S. Cl. ...................................... 60/489
(58) Field of Classification Search .................. 60/489
See application file for complete search history.

(56) References Cited

U.S. PATENT DOCUMENTS 5,353,595 A * 10/1994 Hayashi et al. ............... 60/489
5,575,151 A * 11/1996 Hayashi et al. ............... 60/489

FOREIGN PATENT DOCUMENTS

JP 6-2753 A 1/1994
JP 7-88884 A 9/1995

* cited by examiner

*Primary Examiner*—F. Daniel Lopez
(74) *Attorney, Agent, or Firm*—Birch, Stewart, Kolasch & Birch, LLP

(57) ABSTRACT

A pump and motor distribution valve formed by a hydraulic closed circuit for connection between a pump and a motor. In a hydraulic non-stage transmission CVT including a swash plate plunger type hydraulic pump P and a swash plate plunger type hydraulic motor M connected to each other through a hydraulic closed circuit, a pump swash plate member is driven to rotate. A pump cylinder and a motor cylinder are connected to each other and disposed in a connected state on an output shaft. A motor swash plate, restricted in rotation, is oscillated, and the swash plate angle can be regulated variably. A pump-side spool rotatable as one body with the pump swash plate member and a motor-side spool maintained fixedly are inserted in a valve hole formed in the output shaft to penetrate through the output shaft in the axial direction. A hydraulic closed circuit includes the spools and a plurality of communication oil passages formed in the pump cylinder, the motor cylinder and the output shaft.

8 Claims, 7 Drawing Sheets

HYDRAULIC NON-STAGE TRANSMISSION

CROSS-REFERENCE TO RELATED APPLICATIONS

The present non-provisional application claims priority under 35 USC 119 to Japanese Patent Application No. 2003-069041 filed on Mar. 14, 2003 the entire contents thereof is hereby incorporated by reference.

BACKGROUND OF THE INVENTION

1. Field of the Invention

The present invention relates to a hydraulic non-stage transmission including a swash plate plunger pump and a swash plate plunger motor, wherein a pump discharge port and a pump suction port of the swash plate plunger pump are connected, respectively, to a motor suction port and a motor discharge port of the swash plate plunger pump through a hydraulic closed circuit.

2. Description of Background Art

As to hydraulic non-stage transmissions including a hydraulic pump and a hydraulic motor in combination, a variety of forms of configurations have been known and put to practical use. For example, a hydraulic non-stage transmission are disclosed in Japanese Patent Laid-open No. Hei 6-2753 and Japanese Patent Publication No. Hei 7-88884 which have been proposed by the present applicant. The hydraulic non-stage transmission disclosed in these patent documents includes a swash plate plunger pump, a swash plate plunger motor, and a hydraulic closed circuit for connecting a discharge port and a suction port of the swash plate plunger pump to a suction port and a discharge port of the swash plate plunger motor, wherein a pump swash plate member is driven by an engine, a pump cylinder and a motor cylinder that are connected to each other and disposed in a connected state on an output shaft. A motor swash plate member is restricted in rotation, and the motor swash plate angle can be variably regulated.

In this type of hydraulic non-stage transmission, the pump cylinder and the motor cylinder are connected to each other in a back-to-back relationship with pump and motor distribution valves (distributor valves) disposed at the connected portion, thus forming the hydraulic closed circuit. The pump and motor distribution valves are so configured that an oil discharged from a pump plunger reciprocated in the pump cylinder according to the rotation of a pump swash plate driven to rotate is supplied into a motor cylinder chamber to push the motor plunger. Thus, the motor plunger is moved in the axial direction in sliding contact with a motor swash plate, whereby the motor cylinder is driven to rotate.

Meanwhile, the pump and motor distribution valves are formed by inserting valve spools respectively in a plurality of pump and motor valve spool holes formed to extend radially in the connected portion of the pump and motor cylinders, and providing a pump-side eccentric cam mechanism for reciprocating the pump valve spool according to the rotation of the pump swash plate. A motor-side eccentric cam mechanism is provided for reciprocating the motor valve spool according to the rotation of the motor cylinder. This portion, however, is complicated in structure, and results in a high manufacturing cost.

SUMMARY AND OBJECTS OF THE INVENTION

The present invention has been made in consideration of the above-mentioned problem. Accordingly, it is an object of the present invention to provide a hydraulic non-stage transmission in which pump and motor distribution valves forming a hydraulic closed circuit for connecting a pump and a motor to each other can be made simple in structure and low in manufacturing cost.

In order to attain the above object, according to the present invention, there is provided a hydraulic non-stage transmission including a swash plate plunger pump, a swash plate plunger motor, and a hydraulic closed circuit for connecting a pump discharge port and a pump suction port of the swash plate plunger pump, respectively, to a motor suction port and a motor discharge port of the swash plate plunger motor, wherein a pump swash plate member constituting the swash plate plunger pump is driven by receiving an input rotational drive force. A pump cylinder is provided for forming the swash plate plunger pump with a motor cylinder constituting the swash plate plunger motor that are connected to each other and disposed in a connected state on an output shaft. A motor swash plate member is provided for forming the swash plate plunger motor that is restricted in rotation and the motor swash plate angle can be variably regulated. In addition, the output shaft is provided therein with a valve hole extending in the axial direction with a hollow cylindrical valve spool inserted in the valve hole so as to be rotatable relative to the output shaft. A hydraulic closed circuit is provided that includes a plurality of communication oil passages formed in the pump cylinder, the motor cylinder and the output shaft, and the valve spool is inserted in the valve hole.

In the hydraulic non-stage transmission constituted as above, the valve spool is inserted in the valve hole formed in the output shaft so as to extend in the axial direction, thereby constituting the hydraulic closed circuit. Therefore, the structure of the portion constituting the hydraulic closed circuit, particularly the distribution valve structure, is very small in size and compact, and has a very simple constitution in which only the hollow cylindrical valve spool is used.

In addition, the valve spool can include a pump-side spool member connected to a pump swash plate member to be integrally rotatable and forming an oil passage on the swash plate plunger pump side of the hydraulic closed circuit. A motor-side spool member is restricted in rotation and forms an oil passage on the swash plate plunger motor side of the hydraulic closed circuit.

In this case, preferably, a clutch operating mechanism for moving the pump-side spool member in the axial direction in the valve hole is provided. The pump-side spool member is moved in the axial direction by the clutch operating mechanism, and an oil passage is connected to the pump discharge port with an oil passage connected to the pump suction port which are formed in the output shaft which can be in communication with each other. This makes it possible to produce a neutral condition by only controlling the axial movement of the pump-side spool member, and to perform a clutch control for controlling the capacity of power transmission from the pump to the motor.

In addition, preferably, a lock-up operating mechanism for moving the motor-side spool member in the axial direction in the valve hole is provided. The motor-side spool member is moved in the axial direction by the lock-up operating mechanism, whereby an oil passage forming the hydraulic closed circuit can be shut off. This ensures that a lock-tip control for connecting the pump and the motor directly to each other so as to transmit mechanical rotational power can be achieved by only controlling the axial movement of the motor-side spool member.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
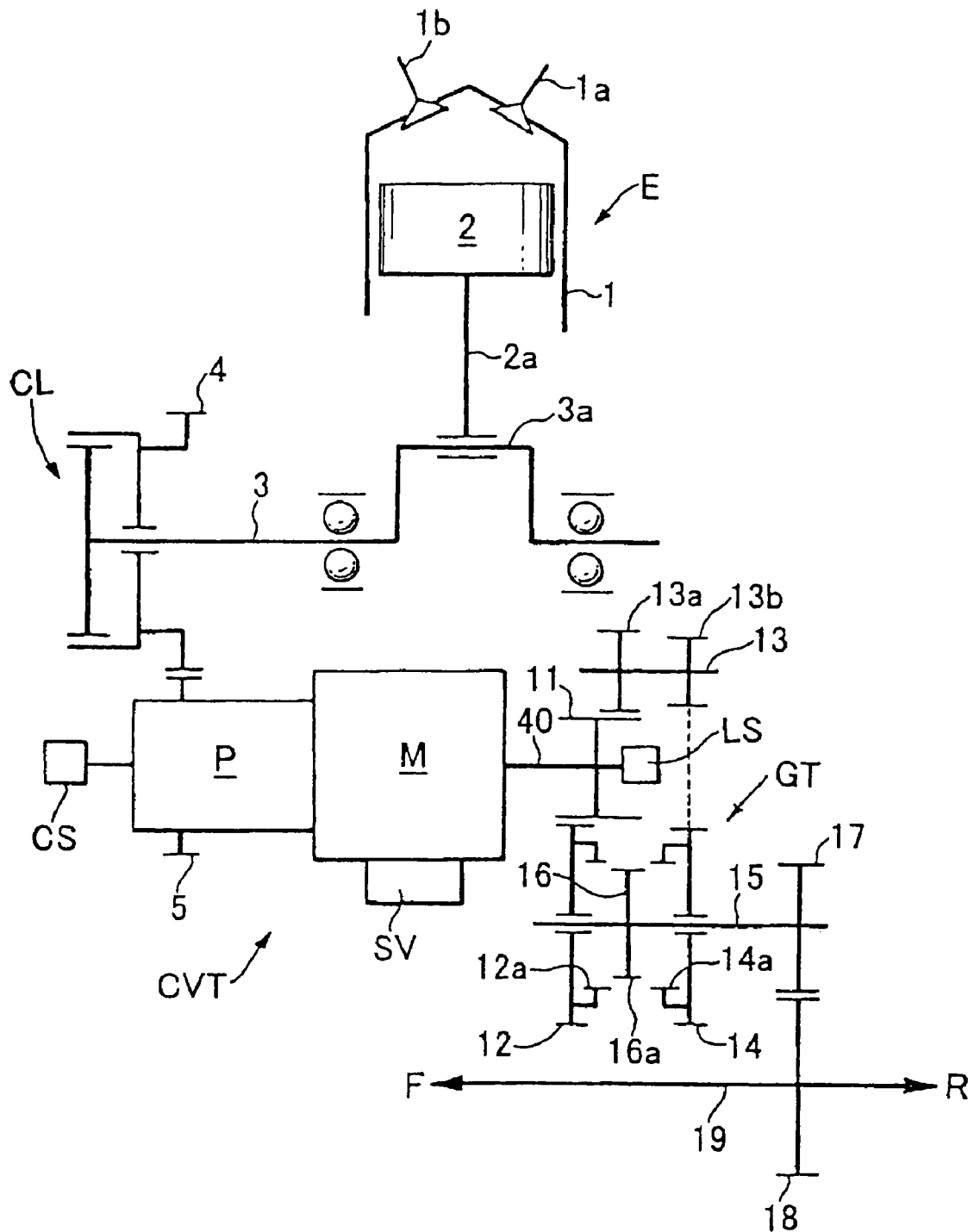
FIG. 1 is a schematic view showing the constitution of power transmission paths of a power transmission system using a hydraulic non-stage transmission according to the present invention.

Now, a preferred embodiment of the present invention will be described below referring to the drawings. First, the constitution of power transmission paths of a power transmission system using a hydraulic non-stage transmission according to the embodiment of the present invention will be described, referring to FIG. 1. The power transmission system includes an engine E for generating a rotational drive force, a main clutch CL for controlling the transmission of the rotational drive force, a hydraulic non-stage transmission CVT for non-stage speed change of the rotational drive force transmitted through the main clutch CL, and a transmission gear train GT for direction changeover and transmission of an output rotation of the hydraulic non-stage transmission CVT.

The engine E includes a piston 2 disposed in a cylinder 1 which is provided with intake and exhaust valves 1a and 1b at a head portion thereof As known, the piston 2 is reciprocated by combustion of fuel in a cylinder chamber, and the motion of the piston 2 is transmitted through a connecting rod 2a to a crank portion 3a, whereby a crankshaft 3 is driven to rotate. The main clutch CL is provided at an end portion of the crankshaft 3, whereby an input drive gear 4 rotatably disposed on the crankshaft 3 and the crankshaft 3 are engaged and disengaged under control. Therefore, a rotational drive force of the crankshaft 3 is transmitted to the input drive gear 4 according to the engagement-disengagement control of the main clutch CL.

The hydraulic non-stage transmission CVT includes a swash plate plunger type hydraulic pump P and a swash plate plunger type hydraulic motor M. An input driven gear 5, connected to a pump swash plate member and forming the swash plate plunger type hydraulic pump P, is meshed with the input drive gear 4, and the rotational drive force of the engine E is transmitted to the input driven gear 5, whereby the pump swash plate member is driven to rotate. Detailed description of the hydraulic non-stage transmission CVT will be made later. The output rotation obtained through the non-stage speed change by the hydraulic non-stage transmission CVT is outputted to a transmission output shaft 40.

A transmission output gear 11 constituting the transmission gear train GT is connected to the transmission output shaft 40, and the rotation of the transmission output shaft 40 is transmitted from the transmission output gear 11 through the transmission gear train GT. The transmission gear train GT includes a counter shaft 15 and an idler shaft 13 which are disposed in parallel to the transmission output shaft 40. A forward-running gear 12 and a rearward-running gear 14 are rotatably disposed on the counter shaft 15, and an output drive gear 17 is disposed in connection to the counter shaft 15. On the other hand, a first idler gear 13a and a second idler gear 13b are disposed in connection to the idler shaft 13. The forward-running gear 12 is meshed with the transmission output gear 11, and the first idler gear 13a is also meshed with the transmission output gear 11. Besides, the second idler gear 3b is meshed with the rearward-running gear 14.

The forward-running gear 12 and the rearward-running gear 14 are provided, respectively, with internal clutch gears 12a and 14a, and a clutch sleeve 16 rotatable integrally with the counter shaft 15 and movable in the axial direction is provided between the forward-running gear 12 and the rearward-running gear 14. The clutch sleeve 16 is provided at its outer circumference with an external clutch gear 16a, which can be selectively meshed with the internal clutch gears 12a and 14a by moving the clutch sleeve 16 in the axial direction. Thus, a dog clutch is formed. Incidentally, the clutch sleeve 16 is moved in the axial direction in response to shift lever operations to the forward-running side and the rearward-running side by the operator.

When a shift lever operation to the forward-running side is made by the operator, the clutch sleeve 16 is moved leftwards in the figure, the external clutch gear 16a is meshed with the internal clutch gear 12a, and the forward-running gear 12 is connected to the counter shaft 15. In this condition, therefore, the rotation of the transmission output gear 11 is transmitted through the forward-running gear 12 to the counter shaft 15, and the output drive gear 17 is driven to rotate.

On the other band, when a shift lever operation to the rearward-running side is made by the operator, the clutch sleeve 16 is moved rightwards in the figure, the external clutch gear 16a is meshed with the internal clutch gear 14a, and the rearward-running gear 14 is connected to the counter shaft 15. In this condition, the rotation of the transmission output gear 11 is transmitted from the first idler gear 13a to the second idler gear 13b through the idler shaft 13, is transmitted further from the second idler gear 13b to the counter shaft 15 through the rearward-running gear 14 meshed with the second idler gear 13b, and the output drive shaft 17 is driven to rotate. In addition, the rotating direction of the output drive gear 17 in this case is in a direction (rearward-running direction) reverse to that in the case of the shift lever operation to the forward-running side.

The output drive gear 17 is meshed with an output driven gear 18 connected and attached to a drive shaft 19, and the rotation of the output drive gear 17 is transmitted to the drive shaft 19 through the output driven gear 18. The drive shaft 19 extends in the front-rear direction to be connected to the front wheel side and to the rear wheel side, and the rotation of the drive shaft 19 is transmitted to the front and rear wheels, to drive the front and rear wheels.

Next, the hydraulic non-stage transmission CVT will be described referring to FIGS. 2 and 3. FIG. 3 illustrates a central portion of FIG. 2 in an enlarged state. In order to obviate a complication with regard to the indication of the symbols, the symbols of pump and motor component members are mainly indicated in FIG. 2, while the symbols of component members of the output shaft and the closed circuit valves are mainly indicated in FIG. 3.

As has been mentioned above, the hydraulic non-stage transmission CVT includes the swash plate plunger type hydraulic pump P and the swash plate plunger type hydraulic motor M. The hydraulic pump P includes a pump swash plate member 21 rotatably supported on a transmission housing HSG, a pump cylinder 22 opposed to the pump swash plate member 21, a plurality of pump plungers 23 slidably disposed in a plurality of pump plunger holes 22a formed to penetrate through the pump cylinder 22 in the axial direction while being arranged in an annular layout surrounding the center axis of the pump cylinder 22 and a pump block 24 joined to an end portion of the pump cylinder 22. The pump swash plate member 21 is integrally provided with the input driven gear 5. In addition, each of the pump plungers 23 includes an outside end portion that makes sliding contact with a swash plate surface 21a of the pump swash plate member 21 while an inside end portion is opposed to the pump block 24 to form a pump oil chamber 23a in the pump plunger hole 22a. As has been mentioned above, when the input driven gear 5 is driven to rotate and the pump swash plate member 21 is rotated relative to the pump cylinder 22, each of the pump plungers 23 is moved in the axial direction along the swash plate surface 21a, and is reciprocated in the pump plunger hole 22a, thereby contracting and expanding the pump oil chamber 23a.

The hydraulic motor M includes a motor swash plate 31 supported to be oscillatable (oscillatable in the directions of arrows A) around an oscillation center O extending in a direction orthogonal to the axis (in the direction orthogonal to the paper surface) by the transmission housing HSG. A motor cylinder 32 is opposed to the motor swash plate member 31 with a plurality of motor plungers 33 slidably disposed in a plurality of motor plunger holes 32a formed to penetrate through the motor cylinder 32 while being arranged in an annular layout surrounding the center axis of the motor cylinder 32. A motor block 34 is joined to an end portion of the motor cylinder 32 and is connected to the pump block 24. Of each of the motor plungers 33, an outside end portion makes sliding contact with a swash plate surface 31a of the motor swash plate 31, while an inside end portion is opposed to the motor block 34 to form a motor oil chamber 33a in the motor plunger hole 32a. In addition, an end portion 31b of the motor swash plate 31 is connected to a motor servo mechanism SV with a control for moving the end portion 31b in the left-right direction in the FIG. 2 that is performed by the motor servo mechanism SV. A control is provided for moving the motor swash plate 31 in the directions of arrows A.

The pump cylinder 22, the pump block 24, the motor cylinder 32, and the motor block 34 are integrally connected to each other, and are connected to the transmission output shaft 40. The transmission output shaft 40 is rotatably supported on the housing HSG. The pump cylinder 22, the pump block 24, the motor cylinder 32, the motor block 34, and the transmission output shaft 40 are rotated as one body.

The transmission output shaft 40 is provided with a valve hole 40a penetrating therethrough in the axial direction, and a pump-side spool 50 and a motor-side spool 60 are inserted in the valve hole 40a so as to be movable in the axial direction.

The pump-side spool 50 includes a pump-side rod portion 51 which extends in the state of being connected to a pump-side valve component portion inserted in the valve hole 40a on the tip end side thereof and which projects outwards from a left end portion of the transmission output shaft 40. The pump-side rod portion 51 is spline-connected to an arm portion 21b connected to the pump swash plate member 21, so that the pump-side spool 50 is rotated as one body with the pump swash plate member 21. As shown in FIG. 1, a clutch operating mechanism CS is provided for moving the pump-side spool 50 to the left side in the axial direction (in the direction of arrow B) is provided at an end portion of the pump-side rod portion 51.

The motor-side spool 60 includes a motor-side rod portion 61 which extends in the state of being connected to a motor-side valve component portion inserted in the valve hole 40a on the tip end side thereof and which projects outwardly from a right end portion of the transmission output shaft 40. The motor-side rod portion 61 is connected to the housing HSG at a right end portion thereof, thereby being restricted in rotation. In this case, the motor-side rod portion 51 is movable in the axial direction, and, as shown in FIG. 1, it is so configured that the motor-side spool 60 can be moved to the right (in the direction of arrow C) by a lock-up operating mechanism LS provided at a right end portion thereof.

Figure 2:
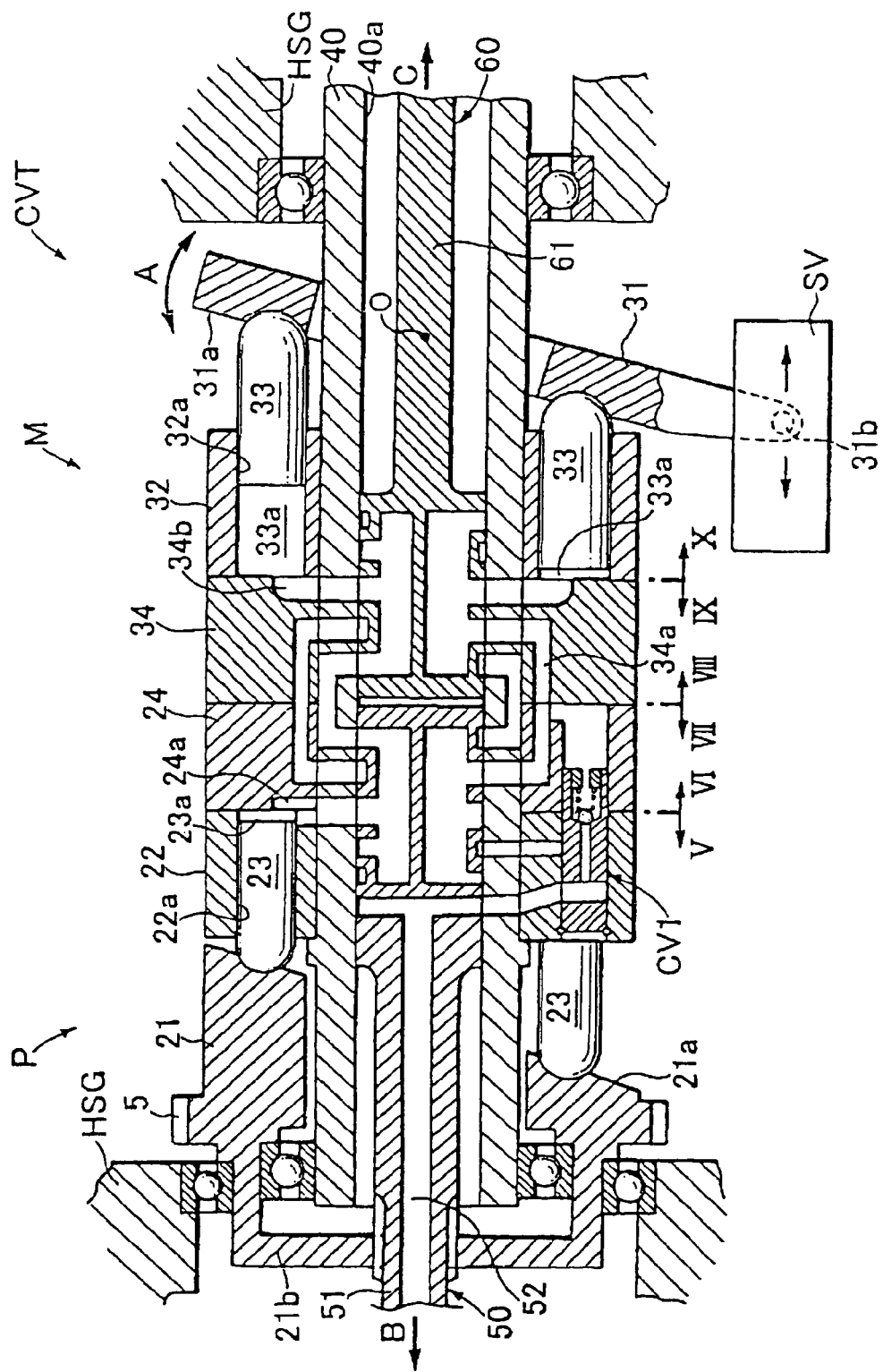
FIG. 2 is a schematic sectional view showing the constitution of the hydraulic non-stage transmission according to the present invention.
Figure 3:
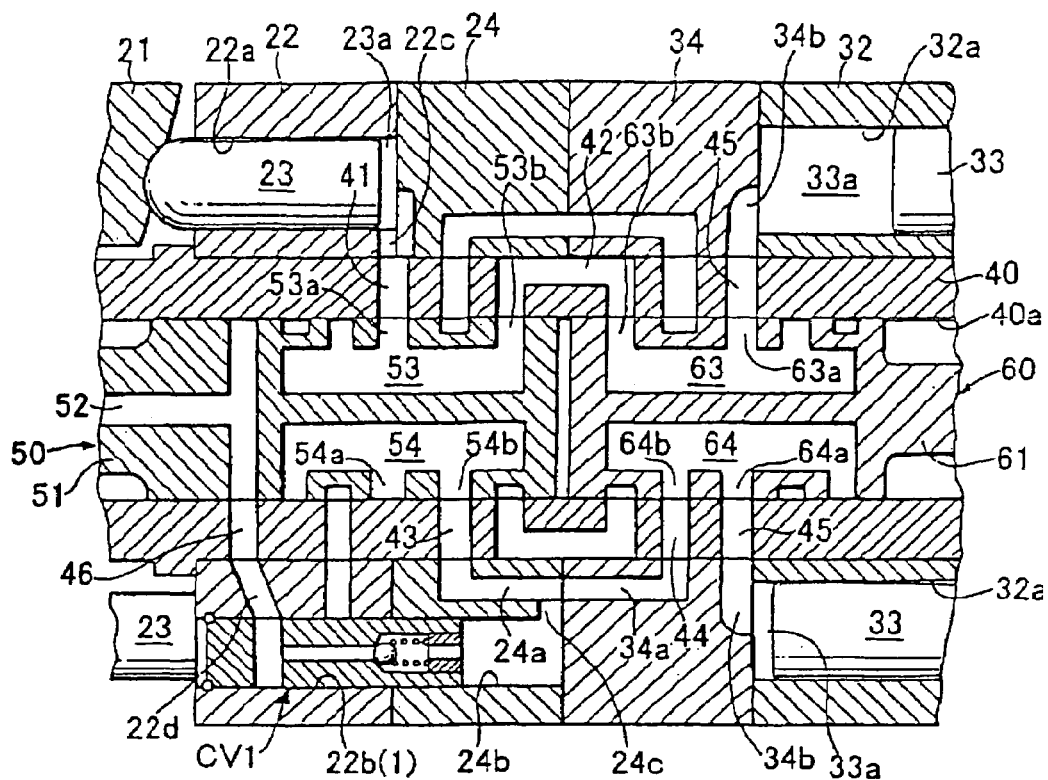
FIG. 3 is a schematic sectional view showing, in an enlarged state, a central portion of the hydraulic non-stage transmission.

The pump-side valve component portion of the pump-side spool 50, the motor-side valve component portion of the motor-side spool 60, and those portions of the transmission output shaft 40 to which the outer circumferences of these valve component portions are opposed are provided with a plurality of oil passages for forming a hydraulic closed circuit for forming a connection between the hydraulic pump P and the hydraulic motor M, as shown in the FIG. 2. The oil passages will be described while describing the operations of the hydraulic pump P and the hydraulic motor M, referring also to the sectional views shown in FIGS. 4 to 11. In FIGS. 4 to 10, the pump-side spool 50 and the motor-side spool 60 in the valve holes 40a in the transmission output shaft 40 are omitted, and the structures of the pump-side spool 50 and the motor-side spool 60 are shown in FIG. 11.

Figure 4:
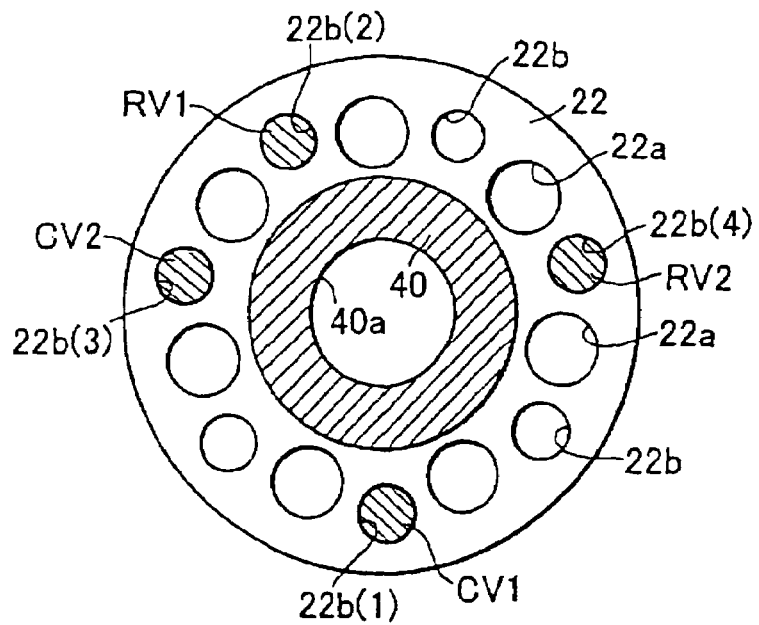
FIG. 4 is a side sectional view, as viewed from the left side, of a hydraulic pump constituting the hydraulic non-stage transmission, in the condition of being mounted on a transmission output shaft.

FIG. 4 shows the pump cylinder 22 as viewed from the left end side. The pump cylinder 22 is provided with seven pump plunger holes 22a penetrating therethrough in the axial direction while being arranged in an annular layout surrounding the center axis thereof, and are provided with seven pump through-holes 22b penetrating therethrough in the axial direction while being located between the pump plunger holes 22a. Of these pump through-holes 22b, the four pump through-holes 22b which include cross-hatching in FIG. 4 are fitted with charge and relief check valves as will be described later, while the rest of the through-holes 22b are provided for rotational balance and for a reduction in weight.

Figure 5:
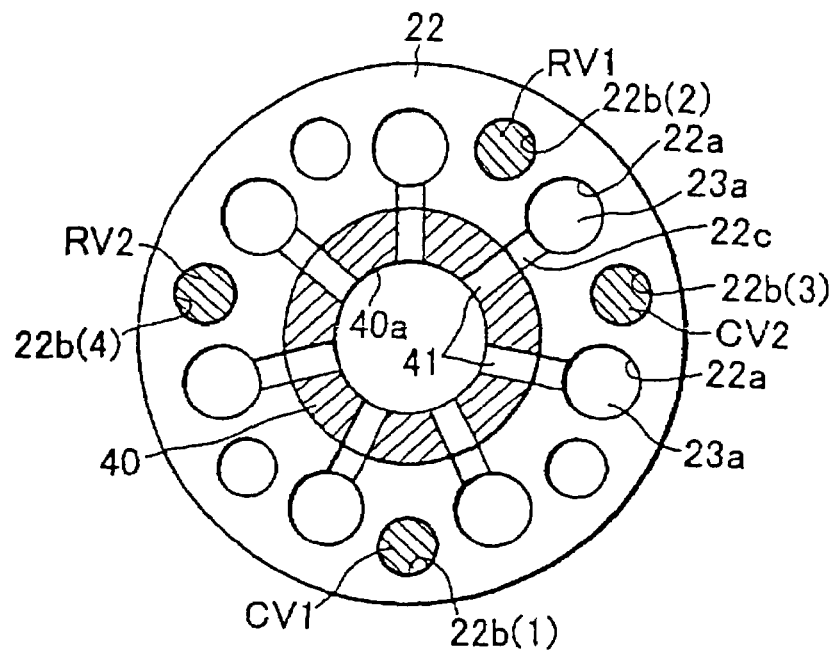
FIG. 5 is a sectional view taken along arrows V—V of FIG. 2, of the hydraulic non-stage transmission.
Figure 6:
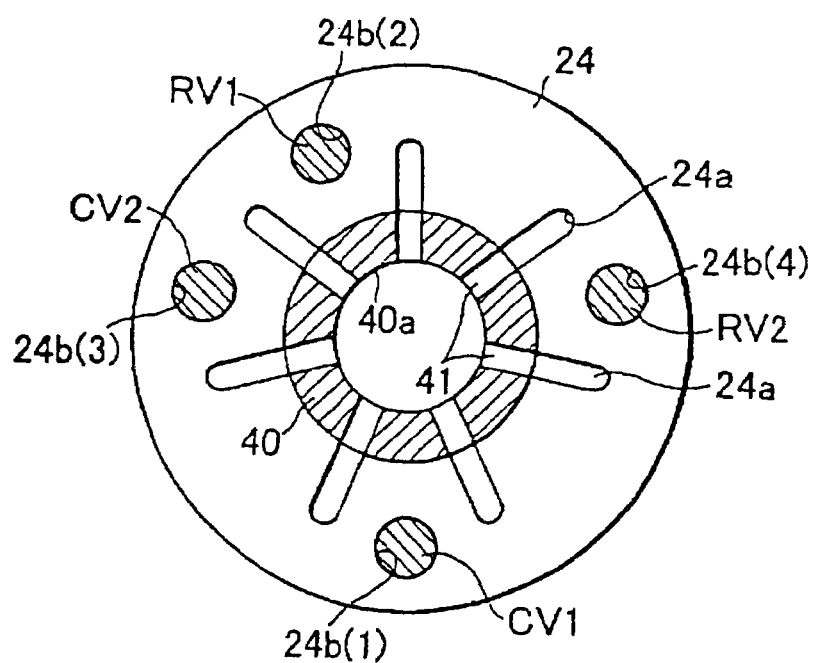
FIG. 6 is a sectional view taken along arrows VI—VI of FIG. 2, of the hydraulic non-stage transmission.

Next, as shown in FIG. 5, the pump cylinder 22 is provided in its inner end portion (the portion of joint to the pump block 24) with a plurality of (seven) pump-side oil passages 22c extending to the inner diameter side from the pump plunger holes 22a (pump oil chambers 23a). Incidentally, a surface of the joint of the pump block 24 to the pump cylinder 22 is provided with grooves 24a extending to the inner diameter side oppositely to the pump-side oil passages 22c, as shown in FIG. 6, for forming the pump-side oil passages 22c together with the grooves 24a. The transmission output shaft 40 is provided with seven first shaft oil passages 41 penetrating therethrough to the valve holes 40a in the state of being connected to the pump-side oil passages 22c that extend radially in the axial direction.

Figure 11:
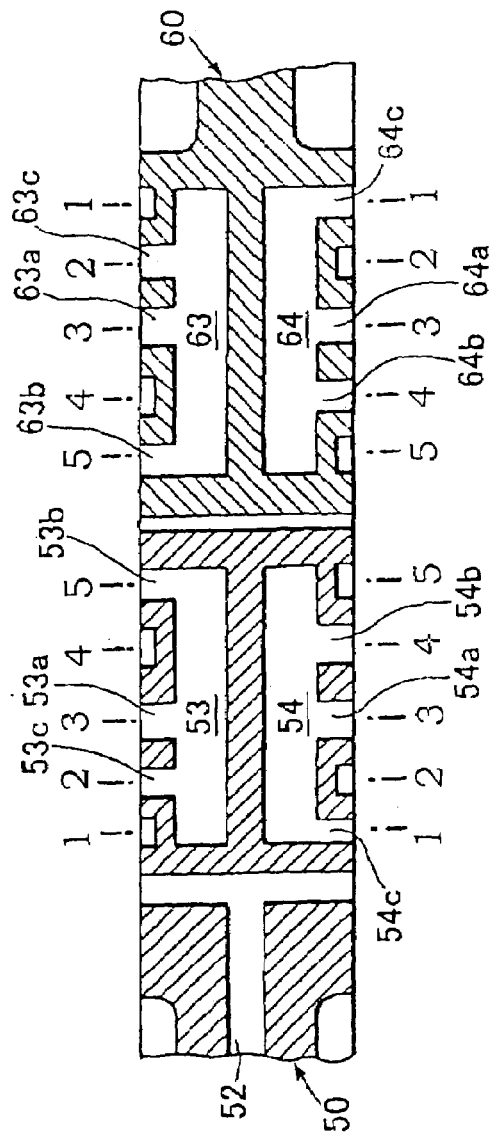
FIG. 11 is a sectional view showing the structures of pump-side and motor-side spools constituting a hydraulic closed circuit in the hydraulic non-stage transmission.
Figures 11A, 11B, 11C, 11D, 11E:
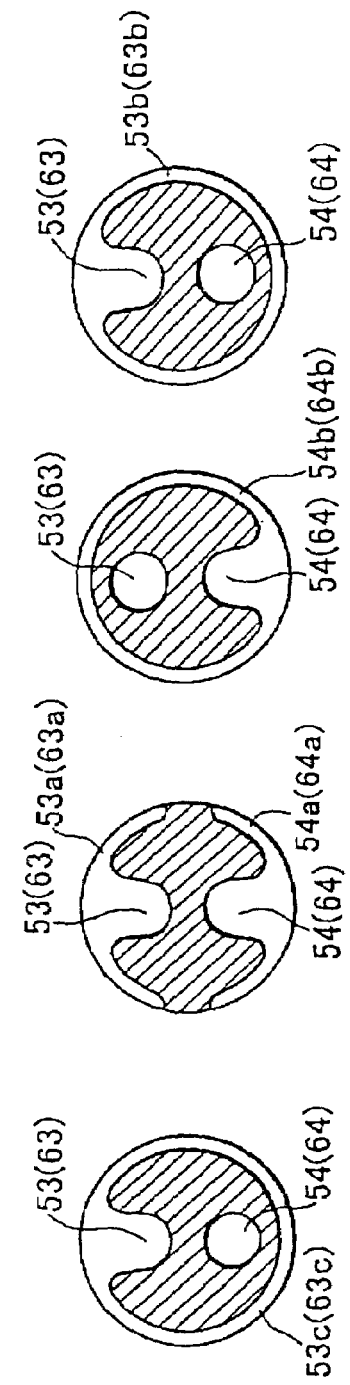
FIGS. 11(A) to 11(E) are sectional views taken along lines 1—1 to 5—5, respectively, in FIG. 11.

As shown in FIG. 11(C), the portion of the pump-side spool 50 to which the inner ends of the first shaft oil passages 41 are opposed has a sectional shape such that it is provided with a semi-circular first high-pressure pump groove 53a connected to a pump-side high-pressure spool oil passage 53 that extends in the axial direction. A semi-circular first low-pressure pump groove 54a is connected to a pump-side low-pressure spool oil passage 54 that extends in the axial direction. Therefore, according to the rotation of the pump-side spool 50 relative to the transmission output shaft 40, the seven first shaft oil passages 41 are each in communication alternately with the first high-pressure pump groove 53a and the first low-pressure pump groove 54a for each half rotation.

When the drive force of the engine E is transmitted to the input driven gear 5 and the pump swash plate member 21 is driven to rotate, the pump plungers 23 are moved in sliding contact with and along the swash plate surface 21a and are reciprocated in the axial direction in the pump plunger holes 22a. Working oil is discharged from the pump oil chambers 23a according to inward movements of the pump plungers 23 and is sucked in according to the outward movements. Here, as has been mentioned above, the pump-side spool 50 is connected to the pump swash plate member 21 so that they are rotated as one body, the first high-pressure pump groove 53a is connected to the pump oil chambers 23a for discharging the working oil according to the inward movements of the pump plungers 23, and the first low-pressure pump groove 54a is connected to the pump oil chambers 23a for sucking in the working oil according to the outward movements of the pump plungers 23. Therefore, the pump-side high-pressure spool oil passage 53 is supplied with the working oil discharged from the hydraulic pump P, and the working oil is sucked from the pump-side low-pressure spool oil passage 54 into the hydraulic pump P.

The pump-side high-pressure spool oil passage 53 extends from a second high-pressure pump groove 53b shown in FIG. 11(E) to be connected to a second high-pressure motor groove 63b shown in FIG. 11(E) through a second shaft oil passage 42 formed in the transmission output shaft 40, and is connected to a motor-side high-pressure spool oil passage 63 formed to extend in the axial direction in the motor-side spool 60. The pump-side low-pressure spool oil passage 54 extends from a second low-pressure pump groove 54b shown in FIG. 11(D) to be connected to a second low-pressure motor groove 64b shown in FIG. 11(D) through the third shaft oil passage 43 formed in the transmission shaft 40, the pump block oil passages 24a formed in the pump block 24, motor block oil passages 34a formed in the motor block 34, and a fourth shaft oil passage 44 formed in the transmission shaft 40, and is connected to a motor-side low-pressure spool oil passage 64 formed to extend in the axial direction in the motor-side spool 60. As shown in FIG. 11, each of the grooves in the pump-side spool 50 and the motor-side spool 60 is formed over the whole circumference of the spool, this being for causing a hydraulic pressure to act uniformly on the whole circumference of the spools and for preventing partial loads from acting on the spools to locate the spools at radially eccentric positions.

Figure 9:
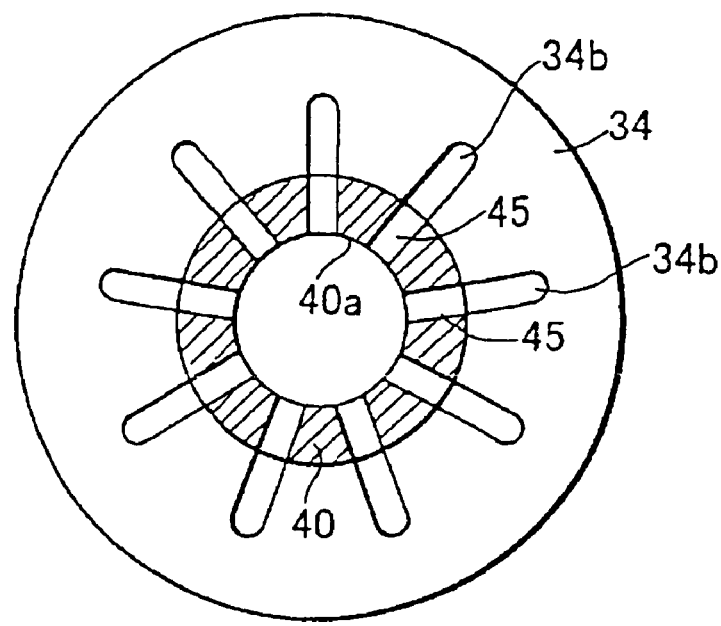
FIG. 9 is a sectional view taken along arrows IX—IX of FIG. 2, of the hydraulic non-stage transmission.
Figure 10:
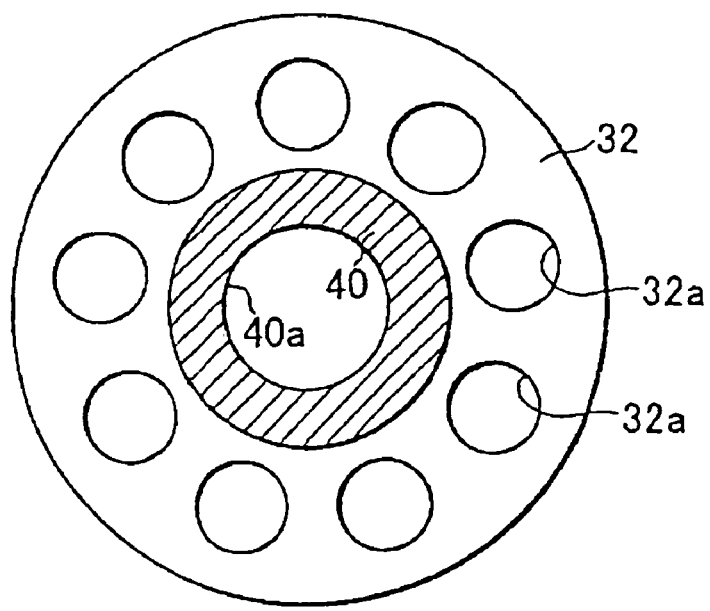
FIG. 10 is a side sectional view, as viewed from the right side, of a hydraulic motor constituting the hydraulic non-stage transmission, in the condition of being mounted on the transmission output shaft.

On the other hand, the motor cylinder 32 is provided with nine motor plunger holes 32a formed to penetrate therethrough in the axial direction while being arranged in an annular form surrounding the center axis thereof, as shown in FIG. 10, and the motor plungers 33 are inserted in the motor plunger holes 32a. As shown in FIG. 9, the motor block 34 is provided with a plurality of (nine) motor-side oil passages 34b extending to the inner diameter side while being in communication with the motor plunger holes 32a (motor oil chambers 33a), respectively. The transmission output shaft 40 is provided with nine fifth shaft oil passages 45 penetrating therethrough to the valve holes 40a while being connected to the motor-side oil passages 34b and extending radially in the axial direction. The portion of the motor-side spool 60 to which the fifth shaft oil passages 45 are opposed has a sectional shape such that it is provided with a semi-circular first high-pressure motor groove 63a connected to the motor-side high-pressure spool oil passage 63 extending in the axial direction, and a semi-circular first low-pressure motor groove 64a connected to the motor-side low-pressure spool oil passage 64, as shown in FIG. 11(C). Therefore, according to the rotation of the transmission output shaft 40 (and the motor cylinder 32) relative to the motor-side spool 60 restricted in rotation, the nine fifth shaft oil passages 45 are each in communication alternately to the first high-pressure motor groove 63a and the first low-pressure motor groove 64a for each half rotation.

As has been mentioned above, when the drive force of the engine E is transmitted to the input driven gear 5 to drive the pump swash plate member 21 to rotate and the pump-side high-pressure spool oil passage 53 is supplied with the working oil discharged from the hydraulic pump P, the working oil is supplied into the motor-side high-pressure spool oil passage 63 through the second shaft oil passage 42. The working oil in the motor-side high-pressure spool oil passage 63 is supplied from the first high-pressure motor groove 63a into the motor oil chambers 33a through the fifth shaft oil passage 45, whereby the motor plungers 33 are pushed outwards in the axial direction. Outside end portions of the motor plungers 33 receiving the axially outward pushing forces are designed to make sliding contact with that portion of the swash plate surface 31a of the motor swash plate 31 which extends from a top dead center to a bottom dead center. By the axially outward pushing forces, the motor cylinder 32 is driven to rotate so that the motor plungers 33 are moved along the swash plate surface 31a from the top dead center to the bottom dead center.

When the motor cylinder 32 is driven to rotate in this manner, the motor plungers 33 are moved by being pushed inwards when they are moved along the swash plate surface 31a from the bottom dead center to the top dead center according to the rotation of the motor cylinder 32, and the working oil in the motor oil chambers 33a is fed from the fifth shaft oil passage 45 into the motor-side low-pressure spool oil passage 64 through the first low-pressure motor groove 64a. The working oil is fed from the second low-pressure motor groove 64b into the pump-side low-pressure spool oil passage 54 through the fourth shaft oil passage 44, the motor block oil passage 34a, the pump block oil passages 24a, the third shaft oil passage 43, and the second low-pressure pump groove 54b, and is sucked from the first low-pressure pump groove 54a into the pump chambers 23a.

As seen from the above description, when the pump swash plate member 21 is driven to rotate by the rotational drive force from the engine E, the working oil is discharged from the hydraulic pump P into the pump-side high-pressure spool oil passage 53 in the pump-side spool 50, and the working oil is then fed into the motor-side high-pressure spool oil passage 63 in the motor-side spool 60, and is further fed to the hydraulic motor M, to drive the motor cylinder 32 to rotate. The working oil having driven the motor cylinder 32 to rotate is fed into the motor-side low-pressure spool oil passage 64, and is further sucked through the pump-side low-pressure spool oil passage 54 into the hydraulic pump P. Thus, the hydraulic closed circuit for connection between the hydraulic pump P and the hydraulic motor M is composed of the transmission output shaft 40 and the pump-side and motor-side spool members 50 and 60 disposed therein. The working oil discharged from the hydraulic pump P according to the rotation of the hydraulic pump P is fed through the hydraulic closed circuit to the hydraulic motor M to drive the hydraulic motor M to rotate, and the working oil discharged after driving the hydraulic motor M is returned through the hydraulic closed circuit to the hydraulic pump P.

In this instance, the pump cylinder 22 and the motor cylinder 32 are rotated in the state of being integrally connected to the transmission output shaft 40. Thus, when the motor cylinder 32 is driven to rotate as above-mentioned, the pump cylinder 22 is also rotated together with the motor cylinder 32, whereby the relative rotating speed between the pump swash plate member 21 and the pump cylinder 22 is reduced. Therefore, the relationship between the rotating speed Ni of the pump swash plate member 21 and the rotating speed No of the transmission output shaft 40 (namely, the rotating speed of the pump cylinder 22 and the motor cylinder 32) is as represented by the following equation (1) in relation to the pump capacity Vp and the motor capacity Vm.

Equation 1

$$Vp \cdot (Ni-No) = Vm \cdot No \quad (1)$$

The motor capacity Vm can be varied steplessly by a control for oscillating the motor swash plate 31 by the motor servo mechanism SV. Therefore, assuming that the rotating speed Ni of the pump swash plate member 21 in the above equation (1) is constant, a control for steplessly varying the motor capacity Vm leads to a speed change control for steplessly changing the speed of rotation of the transmission output shaft 40.

When a control for reducing the oscillation angle of the motor swash plate 31 is performed, the motor capacity Vm is reduced. This results in a control for increasing the rotation of the transmission output shaft 40 to approach the rotating speed Ni of the pump swash plate member 21, i.e., a stepless speed change control to a top speed change stage, under the condition where the pump capacity Vp is constant and the rotating speed Ni of the pump swash plate member 21 is constant in the relationship of the above equation (1). When the motor swash plate angle reaches zero, i.e., when the motor swash plate is set into an upright state, a speed change ratio of Ni=No (top speed change ratio) is theoretically attained, i.e., a hydraulic lock condition is attained, in which the pump swash plate member 21 is rotated as one body with the pump cylinder 22, the motor cylinder 32 and the transmission output shaft 40, whereby mechanical power transmission is performed.

Meanwhile, when the oil flows through the hydraulic closed circuit and the oil pressure is transmitted between the hydraulic pump P and the hydraulic motor M as mentioned above, leakage of the oil arises from the hydraulic closed circuit and leakage of the oil from fitting portions between the pump and motor plunger holes 22a, 32a and the pump and motor plungers 23, 33. In view of this, the pump-side spool 50 is provided with a charge oil supply hole 52 extending in the axial direction, and the charge oil supply hole 52 is in communication to one end side of one pump through-hole 22b(1) of the pump through-holes 22b through a sixth shaft oil passage 46 formed in the transmission output shaft 40 and a charge oil passage 22d formed in the pump cylinder 22. The pump through-hole 22b(1) is fitted with a first charge check valve CV1, and the other end side of the pump through-hole 22b(1) is connected to the pump block oil passage 24a (namely, the oil passage, of the hydraulic closed circuit, for returning the working oil discharged from the hydraulic motor M to the hydraulic pump P) through the groove 24c formed in the pump block 24 (see FIGS. 2 and 7). A charge oil is supplied from a charge oil supply source (not shown) into the charge oil supply hole 52, and the charge oil is supplied through the first charge check valve CV1 into the pump block oil passages 24a, namely, into the hydraulic closed circuit, as required.

Figure 7:
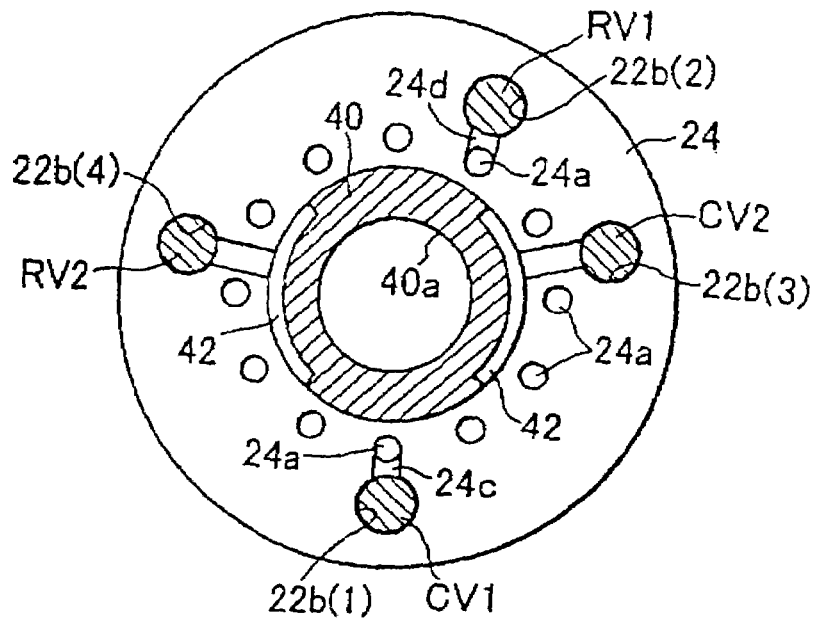
FIG. 7 is a sectional view taken along arrows VII—VII of FIG. 2, of the hydraulic non-stage transmission.
Figure 8:
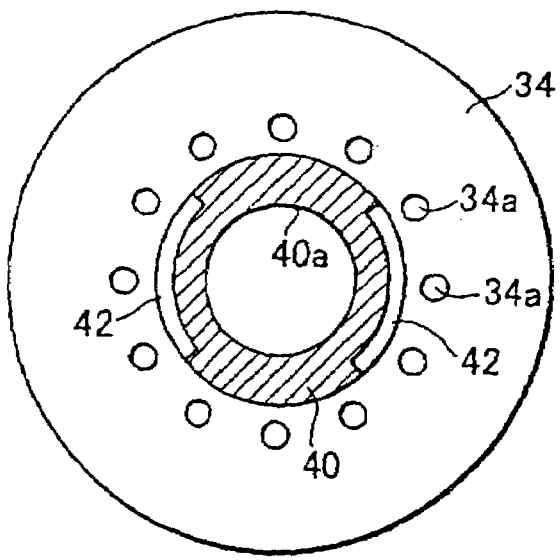
FIG. 8 is a sectional view taken along arrows VIII—VIII of FIG. 2, of the hydraulic non-stage transmission.

As shown in FIG. 7, the rest pump through-holes 22b(2), 22b(3), and 22b(4) are fitted respectively with a first high-pressure relief check valve RV1, a second charge check valve CV1, and a second high-pressure relief check valve RV2. First, the first high-pressure relief check valve RV1 is connected to the pump block oil passages 24a through the groove 24d formed in the pump block 24. When the oil pressure inside the pump block oil passage 24a is raised excessively, the working oil is relieved through the check valve RV1 to the exterior, whereby the pressure inside the pump block oil passage 24a is prevented from rising excessively. The pressure inside the pump block oil passage 24a is raised to a high pressure when an engine brake operation is performed, namely, when driving from the side of the transmission output shaft 40 is performed, and, in this instance, the first high-pressure relief check valve RV1 operates.

The pump through-hole 22b(3) fitted with the second charge check valve CV1 is connected to the charge oil supply hole 52 at its one end and to the second shaft oil passage 42 (namely, the oil passage, of the hydraulic closed circuit, for feeding the working oil discharged from the hydraulic pump P to the hydraulic motor M) at its other end. The charge oil supplied from the charge oil supply source into the charge oil supply hole 52 is supplied through the second charge check valve CV2 into the second shaft oil passage 42, as required. The pressure inside the second shaft oil passage 42 is at a high pressure in a normal operating condition, namely, in the condition where the hydraulic motor M is driven to rotate by being supplied with the working oil from the hydraulic pump P. In this instance, the supply of the charge oil through the second charge check valve CV2 is not performed. However, when the operation is performed under an engine brake operation, the oil pressure in the second shaft oil passage 42 is lowered, and the supply of the charge oil through the second charge check valve CV2 is performed.

The second high-pressure relief check valve RV2 is connected to the second shaft oil passage 42. When the oil pressure inside the second shaft oil passage 42 is raised excessively, the working oil is relieved through the check valve RV2 to the exterior, thereby preventing the pressure inside the second shaft oil passage 42 from rising excessively. The oil pressure inside the second shaft oil passage 42 is at a high pressure in a normal running condition, namely, in the condition where the hydraulic motor M is driven to rotate by being supplied with the working oil from the hydraulic pump P. In this condition, the second high-pressure relief check valve RV2 operates as required, thereby preventing the oil pressure from rising excessively.

Next, a description will be made of an axial movement control on the pump-side spool 50 by a clutch operating mechanism CS, namely, a clutch control. When the pump-side spool 50 is moved as indicated by arrow B in FIG. 2 by the clutch operating mechanism CS to thereby oppose the inner ends of the seven first shaft oil passages 41 to the second low-pressure pump groove 54*b* shown in FIG. 11(D), all the first shaft oil passages 41 are communicated with each other through the second low-pressure pump groove 54*b*. Therefore, a condition is attained in which the working oil discharged from the hydraulic pump P is sucked as it is into the hydraulic pump P, and the working oil is not fed to the hydraulic motor M, so that a neutral condition where power transmission is cut off is attained. Thus, by the control for moving the pump-side spool 50 in the axial direction by the clutch operating mechanism CS, it is possible to perform a control of the capacity of power transmission from the hydraulic pump P to the hydraulic motor M, namely, a clutch control. The power transmission capacity can be arbitrarily regulated by regulating the amount of axial movement of the pump-side spool 50 and regulating the communication opening for communication between the first shaft oil passage 41 and the second low-pressure pump groove 54*b*.

Next, a description will be made of an axial movement control on the motor-side spool 60 by a lock-up operating mechanism LS, namely, a lock-up control. When the motor-side spool 60 is moved as indicated by arrow C in FIG. 2 by the lock-up operating mechanism LS to thereby close the inner ends of the nine fifth shaft oil passages 45 with a land portion of the motor-side spool 60, a condition is attained in which the hydraulic closed circuit is cut off at this portion. Here, when the inner ends of the fifth shaft oil passages 45 are closed (locked up) with the land portion of the motor-side spool 60 by operating the lock-up operating mechanism LS in the condition where the motor swash plate angle is zero, i.e., where the motor swash plate is in an upright state as mentioned above, it is possible to prevent the power transmission efficiency from being lowered due to leakage of the oil at the portion on the hydraulic motor side relative to the closed portion, of the hydraulic closed circuit, and to enhance the power transmission efficiency.

As has been described above, according to the present invention, in a hydraulic non-stage transmission including a swash plate plunger pump and a swash plate plunger motor connected to each other through a hydraulic closed circuit. A pump swash plate member is driven by receiving an input rotational drive force. A pump cylinder and a motor cylinder are connected to each other and disposed in a connected state on an output shaft. A motor swash plate member is restricted in rotation with the motor swash plate angle being capable of being regulated variably. A hollow cylindrical valve spool is inserted in a valve hole formed to extend in the axial direction in the output shaft so as to be rotatable relative to the output shaft. A hydraulic closed circuit includes a plurality of communication oil passages formed in the pump cylinder, the motor cylinder, and the output shaft and the valve spool is inserted in the valve hole. Thus, the hydraulic closed circuit is formed by inserting the valve spool in the valve hole formed to extend in the axial direction in the output shaft. Therefore, the structure of a hydraulic closed circuit component portion, particularly a distribution valve structure can be made very small in size and compact, and a very simple constitution of using only the hollow cylindrical valve spool can be obtained.

The valve spool can include a pump-side spool member which is connected to the pump swash plate member for integral rotation thereof and which forms an oil passage on the swash plate plunger pump side of the hydraulic closed circuit. A motor-side spool member is restricted in rotation and forms an oil passage on the swash plate plunger motor side of the hydraulic closed circuit.

In this case, preferably, a clutch operating mechanism is provided for moving the pump-side spool member in the axial direction in the valve hole. An oil passage is connected to a pump discharge port and an oil passage connected to a pump suction port which are formed in the output shaft which can be in communication with each other by moving the pump-side spool member in the axial direction by the clutch operating mechanism. This makes it possible to produce a neutral condition and to perform a clutch control for controlling the capacity of power transmission from the pump to the motor, by only performing a control of axial movement of the pump-side spool member.

In addition, preferably, a lock-up operating mechanism is provided for moving the motor-side spool member in the axial direction in the valve hole, and an oil passage forming the hydraulic closed circuit can be cut off by moving the motor-side spool member in the axial direction by the lock-up operating mechanism. This makes it possible to connect the pump and the motor directly to each other and thereby to perform a mechanical rotational power transmission, by only performing a control of axial movement of the motor-side spool member.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydraulic non-stage transmission comprising:
a swash plate plunger pump;
a swash plate plunger motor; and
a hydraulic closed circuit for connecting a pump discharge port and a pump suction port of said swash plate plunger pump, respectively, to a motor suction port and a motor discharge port of said swash plate plunger motor;
wherein a pump swash plate member forming a part of said swash plate plunger pump is driven by receiving an input rotational drive force, a pump cylinder forming a part of said swash plate plunger pump and a motor cylinder forming a part of said swash plate plunger motor are connected to each other and disposed in a connected state on an output shaft, a motor swash plate member forming said swash plate plunger motor is restricted in rotation and the motor swash plate angle can be variably regulated;

said output shaft is provided therein with a valve hole extending in the axial direction, a hollow cylindrical valve spool is inserted in said valve hole so as to be rotatable relative to said output shaft;

said hydraulic closed circuit includes a plurality of communication oil passages formed in said pump cylinder, said motor cylinder and said output shaft;

said valve spool includes a pump-side spool member connected to said pump swash plate member so as to be integrally rotatable and forming an oil passage on the swash plate plunger pump side of said hydraulic closed circuit, and a motor-side spool member restricted in rotation and forming an oil passage on the swash plate plunger motor side of said hydraulic closed circuit.

2. The hydraulic non-stage transmission as set forth in claim 1, and further including a first high-pressure relief check valve operatively connected to a swash plate plunger pump low pressure passage for selectively relieving a supply of oil as required.

3. The hydraulic non-stage transmission as set forth in claim 1, further comprising a clutch operating mechanism for moving said pump-side spool member in the axial direction in said valve hole, wherein an oil passage connected to said pump discharge port and an oil passage connected to said pump suction port which are formed in said output shaft can be communicated to each other by moving said pump-side spool member in the axial direction by said clutch operating mechanism.

4. The hydraulic non-stage transmission as set forth in claim 1, and further including a lock-up operating mechanism for moving said motor-side spool member in the axial direction in said valve hole, wherein an oil passage forming said hydraulic closed circuit can be shut off by moving said motor-side spool member in the axial direction by said lock-up operating mechanism.

5. The hydraulic non-stage transmission as set forth in claim 1, and further including a pump oil passage operatively connected to a swash plate plunger pump low pressure passage for selectively supplying a charge of oil as required.

6. A hydraulic non-stage transmission comprising:
a swash plate plunger pump;
a swash plate plunger motor; and
a hydraulic closed circuit for connecting a pump discharge port and a pump suction port of said swash plate plunger pump, respectively, to a motor suction port and a motor discharge port of said swash plate plunger motor;

wherein a pump swash plate member forming a part of said swash plate plunger pump is driven by receiving an input rotational drive force, a pump cylinder forming a part of said swash plate plunger pump and a motor cylinder forming a part of said swash plate plunger motor are connected to each other and disposed in a connected state on an output shaft, a motor swash plate member forming said swash plate plunger motor is restricted in rotation and the motor swash plate angle can be variably regulated;

said output shaft is provided therein with a valve hole extending in the axial direction, a hollow cylindrical valve spool is inserted in said valve hole so as to be rotatable relative to said output shaft;

said hydraulic closed circuit includes a plurality of communication oil passages formed in said pump cylinder, said motor cylinder and said output shaft;

wherein when the swash plate plunger pump is rotated, working oil is discharged from the pump into a pump-side high-pressure spool oil passage in the valve spool for being fed into a motor-side high-pressure spool oil passage to drive the swash plate plunger motor.

7. The hydraulic non-stage transmission as set forth in claim 6, wherein when the swash plate plunger motor is rotated, working oil is fed to a motor-side low pressure spool oil passage and is sucked to a pump-side low-pressure oil passage to be returned through the hydraulic closed circuit to the swash plate plunger pump.

8. The hydraulic non-stage transmission as set forth in claim 7, wherein the relationship between a rotating speed of the swash plate plunger pump and a rotating speed of a transmission output shaft is represented by the following equation:

$$Vp \times (Ni - No) = Vm \times Vo$$

with Vp being the swash plate plunger pump capacity;
Vm being the swash plate plunger motor capacity;
Ni being the rotating speed of the swash plate plunger pump; and
No being the rotating speed of the transmission output shaft.

* * * * *